Patented July 14, 1925.

1,545,873

UNITED STATES PATENT OFFICE.

JEAN ALTWEGG, OF LYON, FRANCE, ASSIGNOR TO SOCIÉTÉ CHIMIQUE DES USINES DU RHONE, OF PARIS, FRANCE.

PROCESS FOR THE MANUFACTURE OF THE ARSENATES OF THE ALKALINE-EARTH METALS.

No Drawing.    Application filed June 16, 1923.    Serial No. 645,920.

*To all whom it may concern:*

Be it known that I, JEAN ALTWEGG, residing at Lyon, France, a citizen of the Confederation of Switzerland, have invented certain new and useful Improvements in Processes for the Manufacture of the Arsenates of the Alkaline-Earth Metals, of which the following is a specification.

The purpose of this invention is the manufacture of the arsenates of the alkaline-earth metals. It has been found that they can be easily obtained on a large scale in heating the corresponding arsenites, or a mixture of oxides or hydroxides of alkaline-earth metals with arsenious oxide ($As_2O_3$) in presence of a sufficient quanity of oxygen.

The arsenites of the alkaline-earth metals may be prepared by heating a mixture of arsenious oxide and of a hydroxide of an alkaline-earth metal.

The arsenites, when heated in an atmosphere of oxygen, exhibit a great affinity for the latter, particularly above about 350° C. It is, besides, not necessary to use pure oxygen, and the oxygen may be diluted with inert gases; for instance, atmospheric air may be quite well utilized. In this case, however, care must be taken to renew constantly the air supplied, for if it becomes too poor in oxygen, there is a risk of formation of metallic arsenic.

The conditions under which the process which forms the object of the invention may be carried out are very varied. For instance, arsenite may be put in an iron tube, raised to the necessary temperature, in which is made to pass a current of air so regulated that no formation of metallic arsenic can take place. Arsenite can also be heated in a closed vessel in communication with a source of oxygen. By the use of a suitable rotating kiln or oven, the manufacture may be carried out continuously.

Example.

A mixture of 100 kilogrammes of arsenious oxide ($As_2O_3$) and 112 kilogrammes of calcium hydroxide is suspended in 700 litres of water and heated to boiling. The calcium arsenite formed is filtered out and heated in a strong current of air, the temperature being gradually raised to about 450° C.

The calcium arsenate is obtained in the form of a pulverulent mass, which may be at once utilized for agricultural purposes.

There is no objection to the use of a quantity of lime greater than that mentioned in the above example if less rich arsenate, containing free lime, is not objected to.

As has been said above, it is not necessary to start with an arsenite prepared for the purpose; a dry mixture of arsenious oxide with the oxide or hydroxide of the corresponding alkaline-earth metal may be used. The mixture, on being heated in a stream of air, preferably near 450° C., absorbs the oxygen and is transformed into the corresponding arsenate.

What I claim and desire to secure by Letters Patent is:—

1. A process of manufacture of the arsenates of the alkaline-earth metals, consisting in heating the arsenite of an alkaline-earth metal while supplying a continuous current of oxygen thereto, the supply of oxygen being regulated so as to prevent the formation of metallic arsenic.

2. A process of manufacture of the arsenates of the alkaline-earth metals, consisting in heating a mixture of arsenious oxide with the oxide of an alkaline-earth metal while supplying a continuous current thereto, the supply of oxygen being regulated so as to prevent the formation of metallic arsenic.

3. A process of manufacture of the arsenates of the alkaline-earth metals, consisting in heating a mixture of arsenious oxide with the hydrated oxide of an alkaline-earth metal while supplying a continuous current thereto, the supply of oxygen being regulated so as to prevent the formation of metallic arsenic.

4. A process of manufacture of the arsenates of the alkaline-earth metals, consisting in heating a dry mixture of arsenious oxide with the hydrated oxide of an alkaline-earth metal to about 450° C. while supplying a continuous current of oxygen thereto, the supply of oxygen being regulated so as to prevent the formation of metallic arsenic.

5. A process of manufacture of the arsenates of the alkaline-earth metals, consisting in heating a dry mixture of arsenious oxide with the hydrated oxide of an alkaline-earth metal to about 450° C. while supplying a continuous current of atmospheric air thereto, the supply of oxygen being regulated so as to prevent the formation of metallic arsenic.

6. A process of manufacture of calcium arsenate consisting in heating calcium arsenite and agitating the same while supplying a continuous current of oxygen thereto, the supply of oxygen being regulated so as to prevent the formation of metallic arsenic.

7. A process of manufacture of calcium arsenate consisting in heating a mixture of arsenious oxide and slaked lime to about 450° C. and agitating the same while supplying a continuous current of oxygen thereto.

In testimony whereof I have signed my name to this specification.

JEAN ALTWEGG.

oxide with the hydrated oxide of an alkaline-earth metal to about 450° C. while supplying a continuous current of atmospheric air thereto, the supply of oxygen being regulated so as to prevent the formation of metallic arsenic.

6. A process of manufacture of calcium arsenate consisting in heating calcium arsenite and agitating the same while supplying a continuous current of oxygen thereto, the supply of oxygen being regulated so as to prevent the formation of metallic arsenic.

7. A process of manufacture of calcium arsenate consisting in heating a mixture of arsenious oxide and slaked lime to about 450° C. and agitating the same while supplying a continuous current of oxygen thereto.

In testimony whereof I have signed my name to this specification.

JEAN ALTWEGG.

Certificate of Correction.

It is hereby certified that in Letters Patent No. 1,545,873, granted July 14, 1925, upon the application of Jean Altwegg, of Lyon, France, for an improvement in "Processes for the Manufacture of the Arsenates of the Alkaline-Earth Metals," errors appear in the printed specification requiring correction as follows: Page 1, line 83, claim 2, and line 92, claim 3, after the word "current" insert the words *of oxygen;* and that the said Letters Patent should be read with these corrections therein that the same may conform to the record of the case in the Patent Office.

Signed and sealed this 17th day of November, A. D. 1925.

[SEAL.]

WM. A. KINNAN,
*Acting Commissioner of Patents.*

Certificate of Correction.

It is hereby certified that in Letters Patent No. 1,545,873, granted July 14, 1925, upon the application of Jean Altwegg, of Lyon, France, for an improvement in "Processes for the Manufacture of the Arsenates of the Alkaline-Earth Metals," errors appear in the printed specification requiring correction as follows: Page 1, line 83, claim 2, and line 92, claim 3, after the word " current " insert the words *of oxygen;* and that the said Letters Patent should be read with these corrections therein that the same may conform to the record of the case in the Patent Office.

Signed and sealed this 17th day of November, A. D. 1925.

[SEAL.]

WM. A. KINNAN,
*Acting Commissioner of Patents.*